Dec. 29, 1970    L. V. GEWISS    3,550,423
METHOD OF MAKING A SHEET OF MATERIAL
HAVING ASYMMETRICAL FOLDS
Filed April 11, 1966    6 Sheets-Sheet 1

Inventor
Lucien Victor Gewiss

By
Lane, Aiken, Dunner & Ziems
Attorneys

Dec. 29, 1970  L. V. GEWISS  3,550,423
METHOD OF MAKING A SHEET OF MATERIAL
HAVING ASYMMETRICAL FOLDS
Filed April 11, 1966  6 Sheets-Sheet 3

Inventor
Lucien Victor Gewiss
By Lane, Aitken, Dunner & Ziems
Attorneys

Inventor
Lucien Victor Gewiss

By
Lane, Aitken, Dunner & Ziems
Attorneys

Dec. 29, 1970   L. V. GEWISS   3,550,423
METHOD OF MAKING A SHEET OF MATERIAL
HAVING ASYMMETRICAL FOLDS
Filed April 11, 1966   6 Sheets-Sheet 5

Inventor
*Lucien Victor Gewiss*

By
*Lane, Aitken, Dunner & Ziems*
Attorneys

Dec. 29, 1970 L. V. GEWISS 3,550,423
METHOD OF MAKING A SHEET OF MATERIAL
HAVING ASYMMETRICAL FOLDS
Filed April 11, 1966 6 Sheets-Sheet 6

Inventor
Lucien Victor Gewiss

By
Lane, Aitken, Dunner & Ziems
Attorneys 3,550,423
METHOD OF MAKING A SHEET OF MATERIAL HAVING ASYMMETRICAL FOLDS
Lucien Victor Gewiss, Vernon, France, assignor to Marc Wood Societe Anonyme pour la Promotion des Eschanges Techniques Internaux, Paris, France, a company of France
Filed Apr. 11, 1966, Ser. No. 541,809
Int. Cl. B21d *5/16, 13/00*
U.S. Cl. 72—363                                               7 Claims

ABSTRACT OF THE DISCLOSURE

Geometrical structures having alternate asymmetrical folds of drawable or extensible material forming two main faces wherein the folds on each of the faces are substantially identical to the other folds on that face. The folds on one of the faces have a rounded profile in cross section which are somewhat wider than the profile of the folds on the other face of the structure. The method of making such asymmetrical structures comprises the steps of placing a face of the material to be folded in contact with a second sheet of material having predetermined characteristics, bending the two sheets of material while in contact along a plurality of parallel folding axes in alternately opposite directions and separating the sheets from one another. One disclosed method comprises the steps of placing two sheets of material to be folded into the described asymmetrical structures in contact with each face of a median layer, bending both of the sheets to be folded while in contact with the median layer, and separating both folded structures by tensioning the median layer.

---

The present invention is related to novel geometrical structures exclusively constituted of alternate folds of drawable or extensible materials in sheet formation and also to the processes which are suitable for the making of such structures as well as to their various applications.

A structure as per the invention is essentially characterized by the fact that the folds, each one identical to the others which are shown onto one of its two main faces, have a profile somewhat wider than that of the folds, all of them also identical, which are present on the opposite face.

The parts of the sheet of such structures which are comprised between the wider folds and the adjoining thinner ones on the opposite face are the inside walls of the structures, all of them being identical or symmetrical. The longitudinal section of each wall parallel to the direction of the folds is a line which can be other than rectilinear as will be explained hereafter. On the other hand, the cross section of each wall from the beginning of one fold to the beginning of the next one is always a straight line.

The structures of the invention can be fashioned from drawable or extensible sheets of material which are either flat or which initially have longitudinal corrugations or pleating on their surface. The alternate folds of such structures can be the result of an ordinary simple pleating or of a chevroning (in which case they have what may be referred to as a "herringbone" configuration), the latter being described by French Pat. 1,106,780 of June 10, 1954, and French Pats. of addition No. 66,207 of July 30, 1954, No. 67,078 of Nov. 29, 1954 and No. 68,479 of May 17, 1955, as well as in U.S. Ser. No. 514,171 filed June 9, 1955, the disclosures of which are hereby incorporated herein by reference.

In every case, the structures, as per the invention, appear on each face to have parallel folds of equal thickness, but this thickness is different from one face to the other. This asymmetric constitution is characterized in that the wider folds being collected in joining contact onto a first plane, the thinner folds of the opposite face are evenly spaced onto another plane which is parallel to the first. The free equal spaces which are provided under such conditions between the thinner folds have for their measure the difference between the width of each of the two different kinds of folds.

If, keeping in close contact the wider folds of a limited length of structure, lying flat onto a plane, the two ends of this structure are lifted up until the top face of the thinner folds comes into contact, it is clear that the structure has taken the shape of a portion of cylindrical annular volume, all the walls of the incurved structure being evenly distributed in a substantially radial, fan-like position. The face of the structure having the thinner folds is now located interiorly of the annular volume (serving as the enveloping surface of its internal free space), while the face of the structure having the wider folds serves as its external enveloping surface.

The above remarks show that it is always possible to determine the respective thickness of the two different folds of a structure which is to fill the whole of an annular cylindrical volume of known outside and inside diameters.

A practical process for forming a sheet of drawable or extensible material into a structure having asymmetric folds as per the invention comprises making the folding of two such sheets at a time by inserting between them a spacer sheet of a layer having a proper thickness and such pliability that will allow for numerous successive foldings without showing permanent wear or malformation.

In submitting to an alternate folding the three-ply sandwich thus constituted (or in chevroning it, if desired), two structures as per the invention are simultaneously obtained whose folds mated (nested) with those of the spacing layer are, for each of them, asymmetric, but however identical from one structure to the other. Disengagement of the two structures thus fashioned from the folds of the median spacing layer can be effected by simply pulling the downstream extremity of this layer.

The straightening of this inner layer which results from such pulling results in the ejection, fold after fold, of the two external asymmetric structures.

When structures having ordinary straight folds are required, the pleating of the three-ply sandwich can be made by any one of the numerous well known manual or mechanized means which are used for producing a regular alternate rectilinear folding.

The pleating of structures having folds of the chevron type can be effected by making use of any of the chevroning processes which have been described by applicant's previous patents and patent applications. More particularly, the chevroning can be hand operated between two mother-sheets as taught by U.S. Pat. 3,135,174, or mechanically formed by means of any of the machines described in said U.S. application Ser. No. 514,171, or French Pat. 1,197,941 of January 1958 and French patent of addition No. 74,561 of Nov. 27, 1958, or U.S. Pat. 2,950,656, the disclosures of which are hereby incorporated herein by reference.

Here, listed as example, are a few noticeable applications for which the structures having asymmetric folds as per the invention can be used either in the original flat form or wrapped into a cylindrical shape:

(I) FLAT STRUCTURES

(a) Sandwich materials

The sandwich cores which are made of sheet materials, either by pleating or by chevroning (see Ser. No. 514,171) are generally affected by an uneven repetition of the walls of their folds. No process can, in fact, give and keep to these walls a perfectly equidistant spacing.

Irregularity in spacing of folds in cores causes a number of the ridge lines of their walls not to meet the inner faces of the sandwich plates. Such walls therefore fail to provide assistance to the total resistance to crushing of the final product.

The present invention, giving the possibility of keeping in adjoining position the wider folds of one face of the core and of insuring an accurate spacing of all their walls, offers a satisfactory solution to this problem. Also, the shape (necessarily rounded) of the profile of the wider folds provides a yielding contact onto the inner face of the sandwich plates which allows for small irregularities to be absorbed.

(b) Filtering screens

Equal spacing of the folds of a filtering layer is an appreciable factor of superiority for a filtering screen.

However, the main advantage of the invention is to be found in the asymmetry of the folds, itself. If, indeed a filtering screen having asymmetric folds is set across the flow of a fluid to be cleaned, its side offering the larger free spaces between folds facing upstream, it is possible to proportion exactly the importance of the free spaces which are necessary between side walls on each face of the screen in accordance with requirements.

On the downstream face of the screen, the distance between adjoining walls should not exceed the space which is necessary for the passage of the filtered flow (rid of material impurities) under the maximum pressure drop which is acceptable.

On the reverse upstream face of the screen, the distance between adjoining walls should be the remainder of the available spacing obviously more important.

This is leaving larger free spaces for collecting the impurities at the bottom of the recesses after their easy interception on adjacent walls.

Larger available spaces between walls on the upstream face of the screen cause the persistence of a free passage provided to the flow to last as long as can possibly be done.

Such filtering screens with asymmetric folds offer, therefore, at equal cost price, a longer duration in service than any equivalent screen made of conventional folds.

(II) CYLINDRICAL STRUCTURES

(a) Insulation

Structures having asymmetric folds produced by making use of sheets of insulating materials such as papers, filters, animal, mineral or vegetable fiber fabrics and the like, and, in a number of special applications, metals under the form of thin or very thin sheets, offer easy means of providing low cost and efficient insulating coatings for wrapping tubings, or any cylindrical capacities. As has been explained hereinbefore, the wrapping of said structures into cylindrical annuli can be effected without any difficulty.

(b) Filtering cartridges

The filtering cartridges which are made by wrapping a pleated filtering layer around a cyindrical free space or a perforated tube is greatly improved when made of asymmetric folds (either rectilinear or chevroned) in the manner of the filtering cartridge described in U.S. Pats. 2,897,971 and 3,087,623, the disclosures of which are hereby incorporated herein by reference.

It is advisable, first of all, to mention that making use of asymmetrical folds leads to an easier and more economical fabrication of such cartridges. This results from the process for fashioning such structure in pairs and the possibility of disengaging them by simply pulling the median spacing strip and also from the ease of converting the structure with asymmetric folds into an annular cylinder having a very even distribution of the pleats on its periphery. Finishing the cylindrical annulus by mating and gluing the two extremities of the wrapped structure is then a very simple operation.

Another advantage of such cartridges is that the outside appearance of their external pleats (the wider pleats) is generally more satisfactory than that of conventional cartridges, because these folds lie on its periphery evenly spread in close and identical position. On the other hand, the practical tests made in submitting cartridges as per the invention to the passage of the flow of contaminated fluid have shown that the duration in service is substantially longer than that of conventional cartridges having the same quality and equal surface of filtering layer pleated in an equal total space.

The longer life of cartridges made of asymmetric folds results from the manufacturing process which allows for gently pleating the layer without crushing and most often somewhat extending its texture, the uniform spreading of the walls of the folds insuring an even contamination of the layer on all its extension.

Further objects and advantages of the present invention will become more apparent in connection with the ensuing description and claims and appended drawings wherein:

Figure 1:
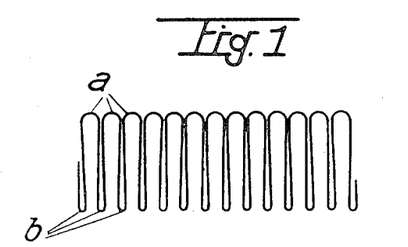
FIG. 1 is, in principle, the outline of the longitudinal profile of the folds of any structure made as per the invention.

The outline drawn in FIG. 1 clearly shows the essential characteristic of structures with asymmetric folds made in accordance with the technique of the present invention. As can be seen in this figure, in such a structure, consisting of the alternate pleating of a sheet of drawable or extensible material, the folds $a$, all identical to one another, which are located on one of the two main faces of said structure, have a profile whose encumbrance is somewhat larger than that of folds $b$, also all identical to one another and on the opposite face. This outline is correct in its principle for any structure as per the invention, should the folds be rectilinear or chevroned.

Figure 2:
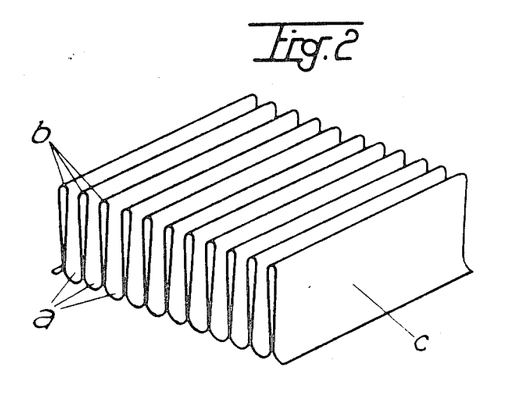
FIG. 2 is a perspective view of a structure as per the invention issued by simple rectilinear pleating of a flat sheet of drawable or extensible material.

FIG. 2 is a materialization, under the shape of a structure having rectilinear folds $c$, of the outline shown in FIG. 1, made out of a flat sheet of drawable material.

Figure 3:
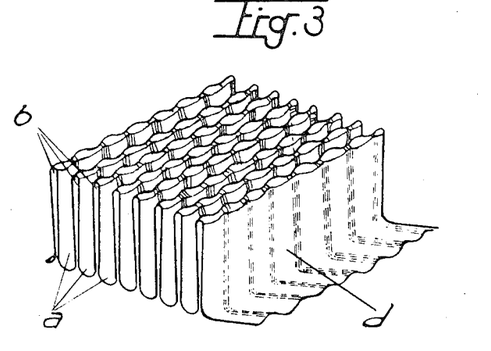
FIG. 3 is a perspective view of a structure produced by simple rectilinear pleating of a longitudinally corrugated sheet of drawable or extensible material.

FIG. 3 is another materialization of the same outline which is also made in the form of a structure having rectilinear folds $d$, but in making use of a sheet of drawable material which, prior to the operation, has been corrugated lengthwise, that is to say, corrugated in a general direction perpendicular to that of the folds $d$.

Figure 4:
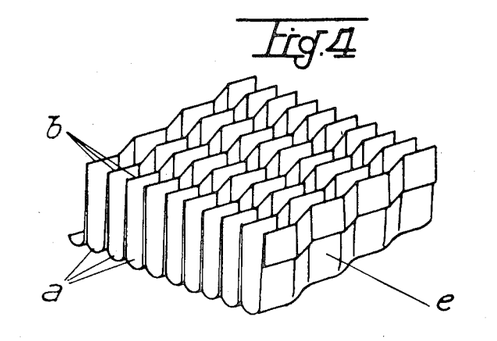
FIG. 4 is a perspective view of a structure produced by chevron pleating of a flat sheet of drawable or extensible material.

FIG. 4 is a materialization of an outline similar to that of FIG. 1 which, in making use of a flat sheet of drawable material, is produced under the shape of a structure having chevroned folds $e$.

As has been explained hereinbefore, a practical process for fashioning an asymmetric structure of any of the types described as per the invention is to fold together two sheets of drawable or extensible material $f$ and $g$ (FIG. 5) between which is inserted a layer $h$ of material having suitable thickness and pliability permitting it to yield to numerous successive foldings without showing excessive wear or permanent malformation.

Figure 5:
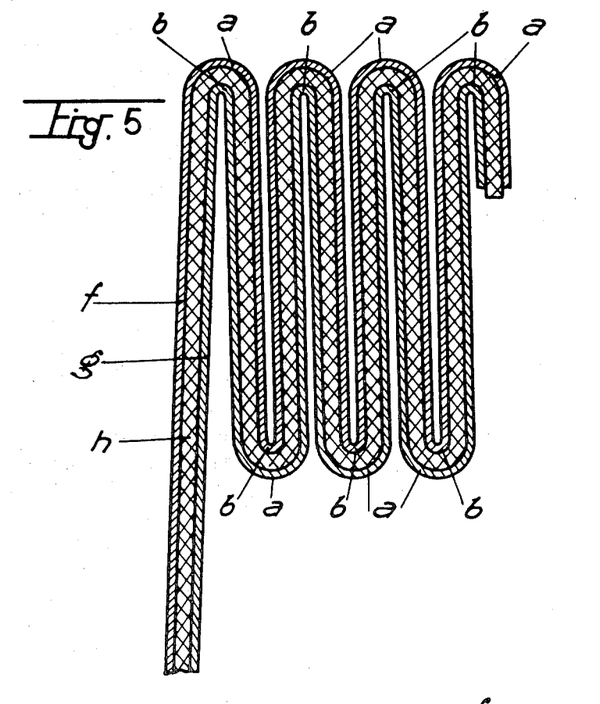
FIG. 5 is an enlarged sectional view of the three-ply sandwich which is used for fashioning the structures as per the invention as it appears after pleating.

The sectional view of FIG. 5 shows after pleating a three-ply sandwich set up in this way. By reason of the insertion of the median layer $h$ between the two sheets $f$ and $g$, the external folds $a$ of each of said sheets have a larger encumbrance than that of the internal folds $b$, this leading to the formation of two structures showing asymmetric folds and having the essential characteristics of the invention.

Figure 6:
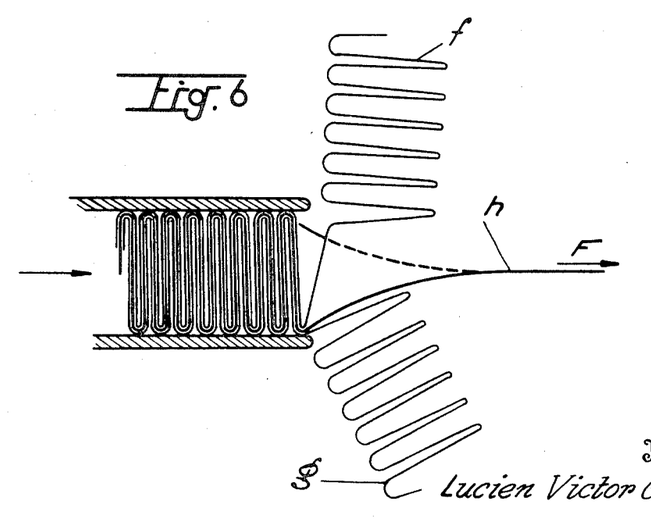
FIG. 6 is a longitudinal sectional view of the three plies of the fashioning sandwich showing their respective positions when their folds are disengaged from one another under the effect of a force imposed on the extremity of the median layer.

FIG. 6 clearly shows how, by pulling the extremity of the median layer $h$ in the direction of arrows F, the two structures folded as above and making use of two sheets $f$ and $g$ disengage their mated folds without alteration of their shape.

Figure 7:
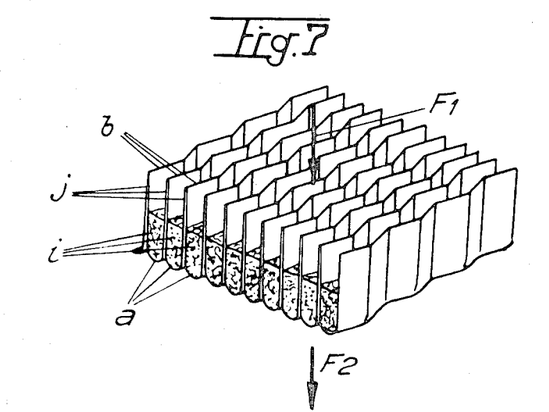
FIG. 7 is a perspective view of a part of a filtering screen of a structure of the FIG. 4 type.

FIG. 7 shows a broken piece of filtering layer, part of a flat filtering screen, which consists of a structure as per the invention identical to that shown in FIG. 4 and having chevroned asymmetric folds.

Arrows $F_1$ and $F_2$ respectively point to the upstream side of the flow of contaminated fluid to be cleaned and the downstream flow of the purified fluid after passage through the layer. Folds $b$ of smaller encumbrance are located on the upstream face of the layer and folds $a$ of larger encumbrance are on the downstream face. As shown, the filtering screen has already been in service for an appreciable length of time for the cleaning of air flowing in the direction of arrows $F_1$ and $F_2$. It can be seen that contaminants $i$ accumulated at the bottom of the larger recesses $a$ have already filled approximately half their height between their walls and that passage of air through the layer is now restricted to the part of these walls which is still free of contaminants. The narrow downstream spaces existing between the wider folds are, even at this state of clogging, large enough for leaving free passage to the purified air, taking into account the spaces of triangular section $j$ existing, to this effect, at the angles of the chevroned pleats.

Figure 8:
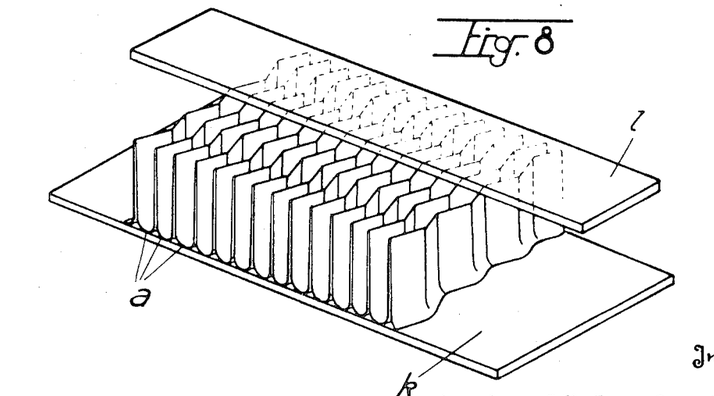
FIG. 8 is a perspective view of a part of a sandwich structure having a core made of a structure as per the invention and whose covering top plate has been partly removed to show the core.

FIG. 8, which represents a broken piece of a sandwich material whose core consists of a chevroned structure also of the type shown in FIG. 4, shows the spacing regularity of the folds of such structure which results from the character of the invention. As has been previously underlined, the wider folds $a$, located at the base of the core, are necessarily of a rounded profile. This insures an intimate contact of folds onto the internal faces of either base $k$ or top plate $l$.

Figure 9:
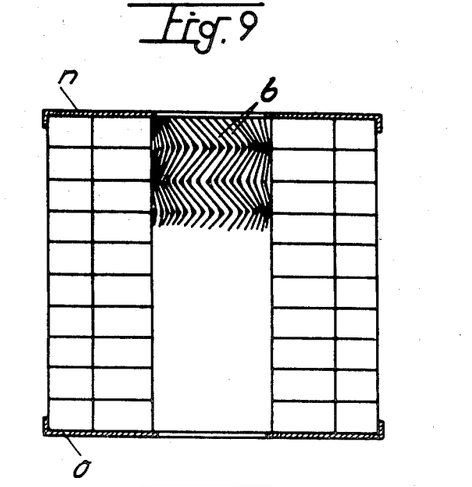
FIG. 9 is a diametrical cross section of a filtering cartridge consisting of an asymmetric structure as per the invention.
Figure 10:
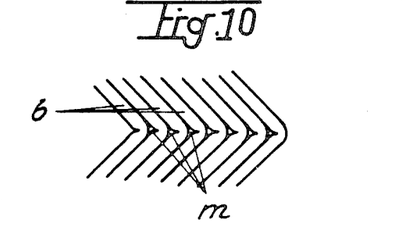
FIG. 10 is an enlarged view of the inner folds of the cartridge shown in FIG. 9.
Figure 11:
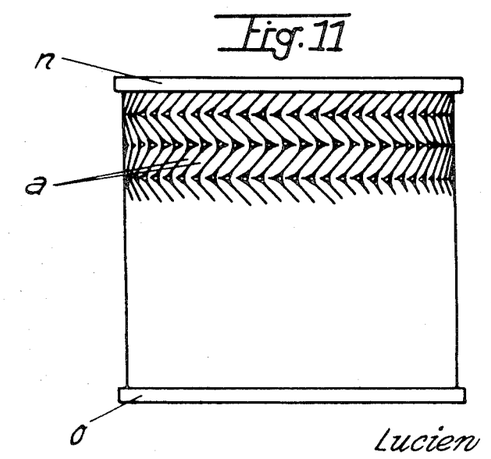
FIG. 11 is an external elevation view of the cartridge of FIG. 9.

FIGS. 9 to 11 are related to a liquid filtering cartridge made of a chevroned asymmetric structure as per the invention, wrapped into a cylindrical annulus. This wrapping has been accomplished by proceeding as described hereinbefore, by lifting up the two extremities of a flat asymmetric structure keeping its wider folds in close contact, until they meet, and can be glued together after proper intermeshing. The length of the structure as well as the respective encumbrance of their wider and thinner folds can be computed so that the complete annular cylinder which is to be formed will have the outside and the inside diameters corresponding to those of the cartridge to be made and also will have their thinner and wider folds in joining position respectively over the internal and external surfaces of said cylindrical annulus.

FIG. 9 shows the position of the thinner internal folds $b$. As can be clearly seen in the enlarged view of FIG. 10, it should be noted that small spaces of triangular section $m$ exist between adjoining folds much in the same form as those of a conventional type of chevroned cartridge and they offer passage to the liquid much in the same way as takes place in such cartridges.

FIG. 11 shows the very remarkable external appearance offered by a filtering cartridge formed from an asymmetric structure made in accordance with the invention. The fact that the external $a$ folds are more encumbrant and joined together does not stop the fluid to be filtered to find its way between the external faces of their walls since, on the one hand, triangular passages similar to those described hereinbefore exist between them and, on the other hand, since the slightest value of pressure drop through a layer of these folds has for its effect to enlarge, as much as necessary, a wider passage than the one existing through the triangular spaces located on the periphery of the central inner free space of the cartridge.

Besides, at the end of the life of such cartridge, it is understandable that the external folds $a$ have a flattened surface, the walls of each fold having come into contact under the effect of the pressure drop seriously raised by reason of the decrease of the available opened surface caused by the clogging filtering layer. This flattening of the external folds is the visible sign of the progressive clogging of the filtering layer.

The cartridge is, naturally, provided at its two ends with sealed caps $n$ and $o$ which, in the example shown, both have a central opening in relation with the central free space of the cartridge. Alternatively, only one of such ends need have such opening, depending on the kind of positioning that this cartridge has to satisfy within the inside of the filter.

Figure 12:
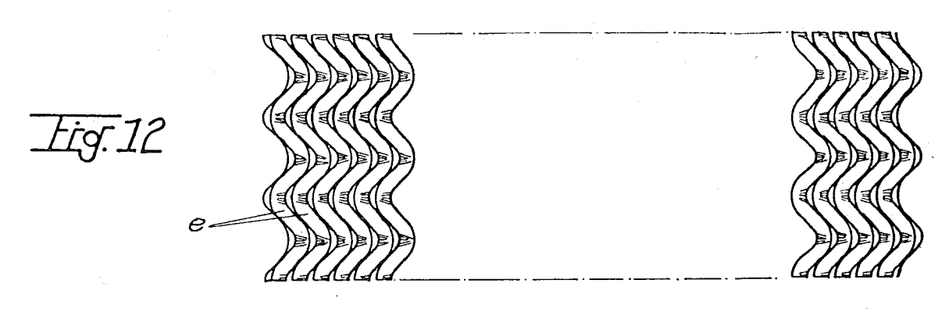
FIGS. 12 and 13 are, respectively, elevation and plan views of a flat structure having asymmetric folds and which is also chevroned in an undulated form.
Figure 13:
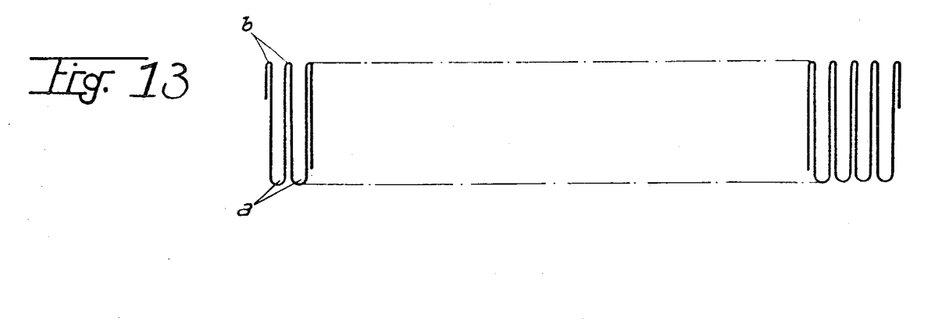

The flat structure with asymmetric chevroned folds $a$ and $b$ which is shown in FIGS. 12 and 13 is, in its general constitution, entirely similar to those which are shown in FIGS. 4, 7 and 8 in that it has been made by chevroning an ensemble of three sheets in the manner shown in FIGS. 5 and 6. It differs from such chevroned structures by the longitudinal form of the chevroned folds $e$, which, in the case of the structure of FIGS. 12 and 13 is undulated and in the form of a smooth curve instead of being in the form of broken or zig-zag lines with abrupt direction changes.

The longitudinally undulated folds have, of course (if compared to the zig-zag folds), the characteristics of having no break or sudden change in direction. The latter present shaping difficulties primarily when the sheets to be fashioned are of a low resistance material such as are filtering layers in thin sheets or most plastic sheetings after they have been softened by heat in order to ease their forming, or such as is the case when the chevroning is mechanically performed by means of shaping bars as is taught in copending application Serial No. 514,171. Such bars, when in zig-zag form, have angular projections which will occasionally produce perforations in the sheets coming in contact over their surface. The undulated form, which permits the use of shaping bars void of angular projections, makes practicable the safe chevroning of the weaker qualities of materials.

In practice, structures with asymmetric folds having longitudinally undulated chevroning offer, for every one of the applications previously listed, the same qualities as those having a zig-zag form, this being so for sandwich materials and filtering screens, as well as for filtering cartridges or insulating products.

Figure 14:
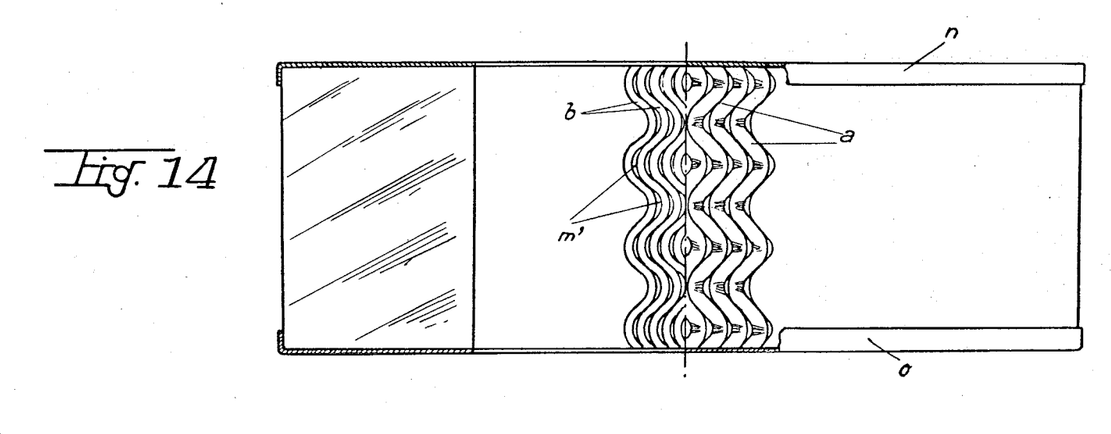
FIG. 14 illustrates (in elevation on its right side and in section on its left side) a filtering cartridge which has been formed in the shape of an annulus having an inner axial free space.
Figure 15:
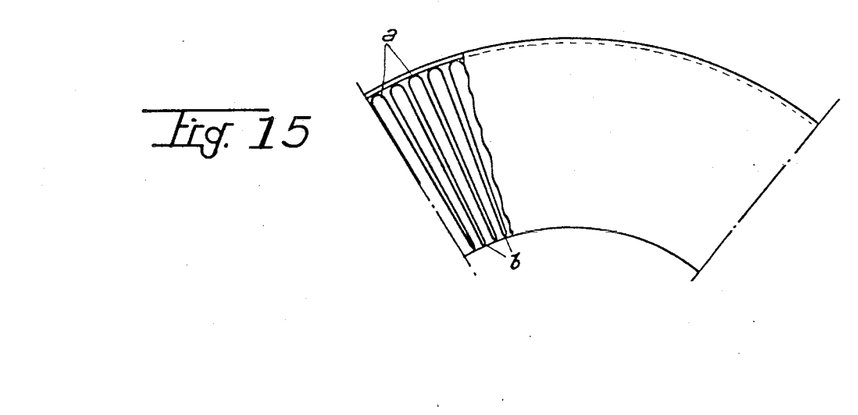
FIG. 15 illustrates (partly in plan view and partly in section) the filtering cartridge shown in FIG. 14.

The filtering cartridge shown in FIGS. 14 and 15 differ from the cartridge shown in FIGS. 9, 10 and 11 but only by the undulated form of its internal and external pleats. In this particular case, the small spaces having triangular sections $m$, most particularly appearing in enlarged form in FIG. 10, are spaces whose section has the shape of a crescent $m'$, of similar importance in value, nested between a large external curb of one fold and a smaller internal curb of the following fold, as can be seen in FIG. 14. In spite of this difference in shape, these spaces $m'$ (which are materially built and therefore cannot be obstructed) play exactly the same technical function of discharging canals for the filtered liquid or fluid as the triangular spaces $m$ in cartridges made of broken folds (as in FIGS. 9–11).

In practice, the filtering cartridges formed of such undulated folds offer efficiency, high output, security in service and a cost price level in production which are, all other conditions being equal, identical in every respect to those related to cartridges having broken chevroned folds.

In the practice of the folding or bending technique described previously in connection with FIGS. 5 and 6, the median layer $h$ which is interposed between the external extensible sheets $f$ and $g$ is fabricated from a material which is not only sufficiently pliable to permit it to be reused in successive folding operations but which has a sufficient memory characteristic to revert substantially completely back to its original planar configuration after each bending operation and which has dimensional stability under the moderate tension imparted to such median layer during its separation from the folded external sheets $f$ and $g$. In addition, such median layer $h$ should be substantially incompressible so that the desired folds are made, the extensible sheets $f$ and $g$ will be appropriately stretched at externally located peaks $a$. Suitable examples of materials appropriate for median layer $h$ are loose feltered fabrics (viz, a pliable felt which is formed of loosely connected fibers), rubber or plastic porous sheets. A particularly satisfactory median sheet may be formed of woven nylon fabric coated on one of its two faces with a rubber foam. Cotton or wool velvet sheets are also suitable.

The thickness of the median layer $h$ will necessarily vary depending upon the amount of space desired between the walls of the external sheets $f$ and $g$ which join together to form the wide peaks $a$. The thicker the median layer, the greater the amount of stretching of the external sheets $f$ and $g$ which will take place and the wider the space which will be formed between such sheet walls. An appropriate thickness of the median layer $h$ for annular filter cartridge applications has been ⅛ inch.

The external extensible sheets $f$ and $g$ may be formed of a great variety of sheet materials provided only that such materials are sufficiently malleable or pliable to permit them to be bent appropriately during the forming process and also sufficiently drawable or extensible to permit them to be stretched adequately at each peak $a$ so that they will be converted to the desired undulated form. Such materials include ordinary writing and kraft papers but preferably those which are porous in nature; filtering papers; felts, preferably of loose constitution and particularly those of the filtering feltered variety; loose woven fabrics of animal, vegetable or artificial fibers such as cotton, wool, silk, nylon, etc.; thermoplastic materials such as cellulose acetate, cellulose acetate butyrate, polyvinyl chloride, polyethylene, polystyrene, etc., as well as woven fabrics made from fibers of such materials.

In order to facilitate the formation of the folds, it is generally advisable to increase the pliability and extensibility of the external sheets $f$ and $g$ at the time they are formed. This can be effected by slightly steaming or dampening the sheets (such as when paper is employed) or by heating them (as in the case of thermoplastic materials) during their upstream travel on the forming machine. Similarly, porous materials used for the purpose may be impregnated with a material such as a melamine or urea-formaldehyde resin which will be permitted to set after the sheets $f$ and $g$ have been appropriately folded. As will be apparent to those skilled in the art, appropriate drying and setting techniques may be utilized to improve the retention by the folded external sheets of the folds imparted to them by the foregoing procedure.

The thickness of external sheets $f$ and $g$ may vary between wide limits depending upon their ultimate end use. For filter cartridge applications, filter material having a thickness of up to ¼ inch has been found to be appropriate.

The forming technique described in connection with FIGS. 5 and 6 employed three sheets sandwiched together, the two external sheets $f$ and $g$ being folded into the desired configuration and the central or median sheet $h$ serving as the forming layer. This three-ply technique provides significant advantages in that it makes possible the simultaneous formation of two folded sheets. In addition, the use of the three-ply system facilitates the desired separation of the walls of the folds between wide dimensional limits since such separation can readily be varied for a given thickness of external sheets $f$ and $g$ by variation in the thickness of median sheet $h$.

Notwithstanding the foregoing advantages of the three-ply system, advantages of the present invention are also obtainable with other than three-ply systems. For example, instead of two external sheets $f$ and $g$, only one such sheet need be placed in contact with forming sheet $h$ (albeit in contact with only one side of such sheet), in which case only one folded sheet will be formed during a given folding operation. The elimination of such second external sheet will, of course, necessarily decrease the overall thickness of the assembly and the separation between the walls of the folded sheet for a given sized median sheet $h$ will be diminished correspondingly. Similarly, more than one extensible sheet may be placed on each side of the median sheet $h$ so that more than one folded sheet will be formed on such side of said median sheet.

Still another alternative presented is to eliminate the median sheet altogether and merely fold a plurality of sheets (even if both are the same extensible sheets) together as a unit. To the extent that the thickness of such sheets permits, the exposed portions of each sheet coinciding with peaks $a$ (as seen in FIG. 5) will be stretched to an extent exceeding any extension taking place at peaks $b$ (as seen in FIG. 5) and a folded sheet of asymmetric configuration will result. Quite obviously, this approach is not as advantageous as the system employing the pliabla, incompressible median layer $h$ as previously described.

A significant advantage of the folding technique of the present invention resides in its utility in forming asymmetrically folded structures of the type heretofore described but having corrugations along an axis normal to the peaks of such asymmetric folds. More specifically, when corrugated material is bent or folded along a line transverse to the direction of the corrugations (assuming that the corrugated material is either sufficiently pliable to permit its being so folded or sufficient force is applied to so fold a structure which would otherwise be too rigid to permit such folding), it is not practicable with presently known techniques to impart a rounded profile (similar to the profile of peaks $a$ in the structure of FIG. 5) to the material along the axis of bending. Unless special tooling is used, a substantially straight line fold forming a sharp angle will result. And even with such special tooling, the best that could be expected would be a flattening of the corrugations in the area adjacent the axis of bending.

In conventional annular filter cartridges, with the filter annulus being arranged in star-shaped configuration about the central filter axis, it is desirable to have the filter material corrugated along radial lines with the peaks of the corrugations extending in a direction normal to the axis of the filter annulus. Such corrugations are designed to spread apart the radially extending walls of the filter material so as to maintain filtering passages between such walls. Because of the difficulty of avoiding flattening of such corrugations at the folds of the filter annulus (for reasons indicated above), however, it is necessary in such filter cartridges to undesirably limit the maximum number of folds at the inner periphery of the filter annulus to avoid inoperability of the filter due to irregular spreading or collection of the filter layers under service conditions.

The forming technique of the present invention, however, eliminates the undesirable flattening of the corrugated filter material during the folding operation by which the asymmetric structures having rounded profiles are formed. Because the median spacer sheet is pliable and substantially incompressible, it takes the form of the corrugations of the external extensible sheets sandwiched about it and the corrugations are not destroyed along the axes of the folds which are imparted to the latter sheets. As a result, filter materials made in accordance with the present invention from corrugated sheets may be employed to form an annular filter cartridge having a greater concentration of folds along its inner peripheral surface than would otherwise be possible using conventional filtering materials.

Asymmetric structures having rounded profiles as described hereinbefore have still further advantages. For example, when employed as filtering media, the rounded profiles of the folded sheet provide greater resistance to crushing when the direction of fluid flow through the filter is from the wide peaks $a$ towards the narrower peaks $b$ since the rounded profile of peaks $a$ serves as an arch to resist any potentially crushing force. On the other hand, when fluid flow is in the opposite direction, the capacity of the filter is increased due to the increased area available to entrain solids (provided by the wider spacing between the walls of the alternate undulations of the filter sheet).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:
1. A method of pleating a sheet of material to form asymmetrically folded structure which includes at least a pair of faces defined by the alternate pleating of a sheet of material, comprising: providing a first sheet of material to be pleated; placing at least one of the faces of such first sheet in intimate contact with a second sheet of material which is of sufficient size to cover the portions of said first sheet to be pleated; folding said two sheets while in intimate contact with one another successively along a series of parallel folding axes in such a manner that the folds of material along one face of said structure are wider than the folds of material along the other face thereof the material of said first sheet being sufficiently extensible at the time of said folding operation so that it will be stretched along those parallel folding axes coinciding with points at which said first sheet is exposed with respect to said second sheet; and separating said first and second sheets from one another.

2. A method as defined in claim 1 further including the step of providing at least another of said first sheets of extensible material and wherein the step of placing includes placing one of said first sheets in intimate contact with each face of said second sheet; and wherein the step of folding occurs while both of said first sheets are in intimate contact with said second sheet; and the step of separating includes the step of separating both of said first sheets from said second sheet after said folding operation, whereby a pair of said structures are formed.

3. A method as defined in claim 2 wherein the step of separating includes the step of tensioning said second sheet which is made of a substantially incompressible material.

4. A method as defined in claim 3 wherein said second sheet is made of a material which is planar before said folding operation and which will substantially completely resume its planar configuration after said first sheets are separated therefrom following said folding operation.

5. A method as defined in claim 1 wherein, prior to said folding operation, said first sheet is provided with corrugations; and wherein the step of folding includes first placing the axis of said corrugations in a position normal to said series of parallel folding axes along which said sheets are bent.

6. A method as defined in claim 1 wherein the step of providing includes providing said first sheet formed of a single ply of material.

7. The method as defind in claim 1 wherein the step of folding is further characterized in that a fold of material in either of said pair of faces is substantially identical to the other folds of material in that face.

References Cited

UNITED STATES PATENTS

| | | | |
|---|---|---|---|
| 1,587,462 | 6/1926 | Adams et al. | 264—286 |
| 2,318,497 | 5/1943 | Kassel | 264—286 |
| 2,979,400 | 4/1961 | Mouinen | 29—163.5 |

LOWELL A. LARSON, Primary Examiner

U.S. Cl. X.R.
29—163.5; 72—379